United States Patent
Gummalla (10) Patent No.: US 8,779,999 B2
(45) Date of Patent: Jul. 15, 2014

(54) ANTENNAS FOR COMPUTERS WITH CONDUCTIVE CHASSIS

(75) Inventor: Ajay Chandra Venkata Gummalla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 13/269,572

(22) Filed: Oct. 8, 2011

(65) Prior Publication Data

US 2013/0082884 A1 Apr. 4, 2013

Related U.S. Application Data

(60) Provisional application No. 61/541,740, filed on Sep. 30, 2011.

(51) Int. Cl.
| | | |
|---|---|---|
| *H01Q 13/10* | (2006.01) | |
| *H01Q 5/00* | (2006.01) | |
| *H01Q 1/22* | (2006.01) | |
| *H01Q 1/24* | (2006.01) | |

(52) U.S. Cl.
CPC ............ *H01Q 13/10* (2013.01); *H01Q 5/0062* (2013.01); *H01Q 5/0024* (2013.01); *H01Q 1/24* (2013.01)
USPC .......................................... 343/767; 343/702

(58) Field of Classification Search
CPC . H01Q 5/0024; H01Q 5/0027; H01Q 5/0044; H01Q 5/0051; H01Q 5/0062; H01Q 5/0065; H01Q 13/10; H01Q 1/24; H01Q 1/241; H01Q 1/242
USPC .................................................. 343/767, 702
See application file for complete search history.

(56) References Cited

U.S. PATENT DOCUMENTS

| | | | | |
|---|---|---|---|---|
| 6,424,300 | B1 * | 7/2002 | Sanford et al. | 343/702 |
| 6,573,869 | B2 * | 6/2003 | Moore | 343/702 |
| 6,985,108 | B2 * | 1/2006 | Mikkola et al. | 343/700 MS |
| 7,551,142 | B1 * | 6/2009 | Zhang et al. | 343/702 |
| 7,612,725 | B2 * | 11/2009 | Hill et al. | 343/702 |
| 7,864,123 | B2 * | 1/2011 | Hill et al. | 343/702 |
| 8,094,079 | B2 * | 1/2012 | Schlub et al. | 343/702 |
| 8,094,082 | B2 * | 1/2012 | Rudant et al. | 343/725 |
| 2007/0120749 | A1 | 5/2007 | Tsai et al. | |
| 2009/0066596 | A1 | 3/2009 | Fujishima et al. | |
| 2009/0256757 | A1 * | 10/2009 | Chiang et al. | 343/702 |
| 2010/0123632 | A1 | 5/2010 | Hill et al. | |
| 2010/0238079 | A1 | 9/2010 | Ayatollahi et al. | |
| 2011/0181480 | A1 * | 7/2011 | Hsieh et al. | 343/767 |

FOREIGN PATENT DOCUMENTS

WO    2008122831 A1    10/2008

OTHER PUBLICATIONS

International Search Report and Written Opinion for PCT Application No. PCT/US2012/054876, mailed Nov. 30, 2012, 15 pages.

* cited by examiner

*Primary Examiner* — Dameon E Levi
*Assistant Examiner* — Jennifer F Hu
(74) *Attorney, Agent, or Firm* — Brake Hughes Bellermann LLP (57) ABSTRACT

According to one general aspect, an apparatus may include an electrically conductive frame and a slot antenna. The slot antenna may be formed, at least in part, by the electrically conductive frame, wherein the slot antenna includes a slot opening and is configured to provide at least a first frequency resonance. The width of the slot opening may be equal to or less than $\frac{1}{200}^{th}$ of the wavelength of the first resonant frequency.

20 Claims, 6 Drawing Sheets

902 Transmitting an electrical signal to a feed point of an antenna system

904 Transmitting a second electrical signal to a second feed point of an antenna system

ANTENNAS FOR COMPUTERS WITH CONDUCTIVE CHASSIS

CROSS-REFERENCE TO RELATED APPLICATION

This application claims priority under 35 U.S.C. §119 to Provisional Patent Application Ser. No. 61/541,740, entitled "ANTENNAS FOR COMPUTERS WITH CONDUCTIVE CHASSIS" filed on Sep. 30, 2011. The subject matter of this earlier filed application is hereby incorporated by reference.

TECHNICAL FIELD

This description relates to the transmission and reception of electrical signals, and more specifically to a slot antenna.

BACKGROUND

Metal or more generally conductive housings for laptops and tablets, etc. are becoming fashionable. Generally, these metal or more generally conductive housings provide an elegant look and mechanical strength to a computer design. However it makes the antenna problem challenging.

Typical antenna designs like Monopole, Inverted F Antenna (IFA), or Planar IFA (PIFA) each require certain height or a certain distance from an electrical ground to provide adequate bandwidth and radiate efficiently. When coupled with a conductive housing, the desired height and distance may not be possible.

A slot antenna typically includes a metal surface, usually a flat plate, with a hole or slot cut out. When the plate is driven as an antenna by a driving frequency, the slot radiates electromagnetic waves in similar way to a dipole antenna. Generally, the shape and size of the slot, as well as the driving frequency, determine the radiation distribution pattern. However, in order to act as an antenna for modern networking frequencies (e.g., cellular, wireless local area network (WLAN or Wi-Fi), etc.), a slot antenna traditionally requires a very wide slot (e.g., greater than 6-7 mm). Alternatively, a slot antenna with a smaller slot would traditionally lack the desired bandwidth or radiating frequencies. Both these deficiencies limit practical application of a slot antenna within a conductive housing.

SUMMARY

According to one general aspect, an apparatus may include an electrically conductive frame and a slot antenna. The slot antenna may be formed, at least in part, by the electrically conductive frame, wherein the slot antenna includes a slot opening and is configured to provide at least a first frequency resonance. The width of the slot opening may be equal to or less than $1/200^{th}$ of the wavelength of the first resonant frequency.

According to another general aspect, a method may include transmitting an electrical signal to a feed point of an antenna system. The antenna system may include a slot antenna. The slot antenna may be included by an electrically conductive frame. The slot antenna may include a slot opening. The slot antenna may be configured to provide at least a first frequency resonance. The width of the slot opening may be equal to or less than $1/200^{th}$ of the wavelength of the first resonant frequency.

According to another general aspect, an apparatus may include a processor, a monitor, an electrically conductive housing, and an antenna system. The processor may execute instructions. The monitor may display information to a user. The electrically conductive housing may at least partially house the processor, the monitor, and the antenna system. The antenna system may include a slot antenna. The slot antenna may be included by the electrically conductive housing. The slot antenna may include a slot opening. The slot antenna may be configured to provide at least a first frequency resonance. The width of the slot opening may be equal to or less than $1/200^{th}$ of the wavelength of the first resonant frequency.

The details of one or more implementations are set forth in the accompanying drawings and the description below. Other features will be apparent from the description and drawings, and from the claims.

A system and/or method for a slot antenna, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
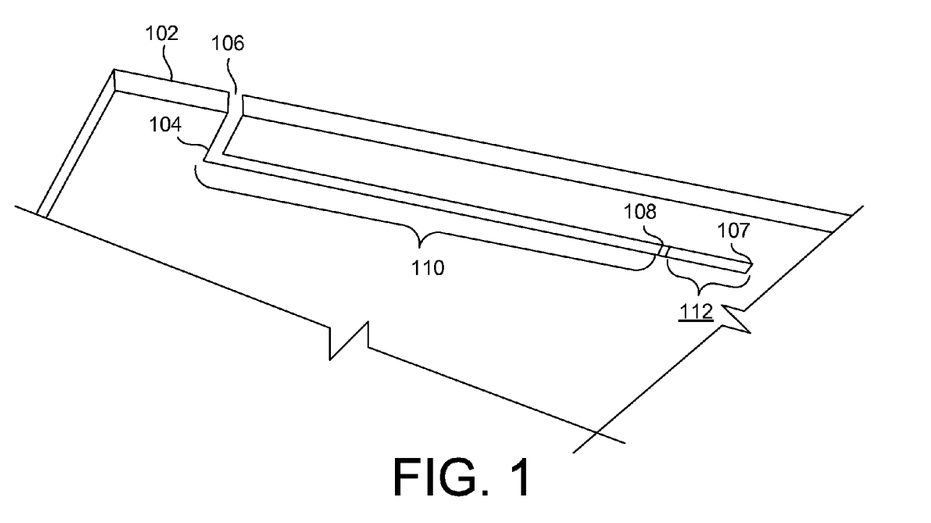
FIG. 1 is a diagram of an example embodiment of a system in accordance with the disclosed subject matter.

FIG. 1 is a diagram of an example embodiment of a system 100 in accordance with the disclosed subject matter. In a preferred embodiment, the system 100 may include a computing device, such as, for example, a shared computing terminal, a thin client, a desktop personal computer, a laptop, a netbook, a tablet, a smartphone, etc.

In such an embodiment, the system 100 may include an electrically conductive housing or frame 102. In various embodiments, this electrically conductive housing or frame 102 may include metal (e.g., aluminum, magnesium alloy, titanium, etc.).

In some embodiments, a laptop chassis, for example, may be divided into four parts or sections. The A-case may include the portion of the laptop chassis above or behind the laptop screen or the rear lid. The B-case may include the portion on the laptop chassis in front of or on the same side as the laptop screen, or the front lid. The C-case may include a portion that includes the top of the non-screen side or the keyboard side of the laptop. The D-case may include the bottom, under-carriage, or feet-side of the laptop. It is understood that the above is merely one illustrative example to which the disclosed subject matter is not limited.

In various embodiments, an antenna is often placed within the A-case of the laptop between the chassis and the laptop display (e.g., LCD screen, etc.). This space is often very small (e.g., 4 or 5 mm). As such, the antenna may rest against the metal or electrically conductive chassis making it difficult for the antenna to radiate well or have a wide bandwidth or range of supported frequencies. In various embodiments, in which the case is plastic or non-conductive or the antenna has been moved away from its traditional location in the A-case (e.g., the hinge between the screen and the keyboard/bottom "half" of the laptop, etc.) this may not be an issue. Similar antenna design issues or concerns may occur for other computing devices (e.g., tablets, smartphones, etc.). It is understood that the above is merely one illustrative example to which the disclosed subject matter is not limited.

In the illustrated embodiment, the system 100 may include a slot antenna 104. In various embodiments, this slot antenna 104 may include a quarter wavelength slot antenna. In some embodiments, the slot opening 106 of the slot antenna 104 may be built into the conductive frame 102. For example, the slot opening 106 may be included as part of a logo or other design visible on the exterior of the computing device's chassis or frame. In various embodiments, a similar slot may be accomplished when two metal pieces are closely spaced and joined at one or more places. For example, a metal hinge may be attached to the A case with a spacing of 1 mm or less. It is understood that the above is merely one illustrative example to which the disclosed subject matter is not limited.

In various embodiments, the slot antenna 104 may be excited by an electrical signal (not shown). This electrical signal may include the signal which the slot antenna 104 is to transmit. It is understood that the slot antenna 104 may also receive transmitted electrical signals. However, for the sake of simplicity the slot antenna 104 will be generally described as transmitting or radiating the electrical signal and it is understood that this terminology is not limited on the disclosed subject matter.

In various embodiments, the electrical signal may include a ground and an active or non-ground portion, and may be supplied to the slot antenna 104 via a wire or cable (e.g., a co-axial cable, twisted pair wire, etc.). In one embodiment, the ground of the electrical signal may be applied to the conductive frame 102. In a specific embodiment, the ground of the electrical signal may be coupled with a non-isolated portion of the conductive frame 102 (e.g., portion 708 of FIG. 7, etc.). In such an embodiment, this may cause the conductive frame 102 to act as a ground plane for the slot antenna 102. The active or non-ground portion of the electric signal may be coupled with the slot antenna 104 at a feed point 108. In various embodiments, the feed point 108 may be a portion of the flat edge side of the slot antenna 104 and not connected to both sides or edges of the slot antenna 108 (e.g., the feed point 108 may be shown as being larger than actual size for illustrative purposes).

In various embodiments, by choosing a feed point 108 along the slot antenna 104, the slot antenna 104 may be seen as including an open circuited portion 110 in parallel with a short circuited portion 112. In such an embodiment, the open-circuited portion 110 may be seen as an open circuited transmission line and may be defined as the portion of the slot antenna 104 from the feed point 106 to the slot opening 106 that causes the transmission line to be open-circuited. Likewise, the short-circuited or closed-circuited portion 112 may be seen as an open-circuited transmission line and may be defined as the portion of the slot antenna 104 from the feed point 106 to the closed end 107 of the slot antenna that causes the transmission line to be short-circuited.

In various embodiments, by balancing the capacitance of the short circuited portion 112 with the inductance of the open-circuited portion 110, one can adjust the impedance of the slot antenna 104. In some embodiments, the feed point 108 may be moved or slide along the length of the slot antenna 104 adjust the respective capacitance and inductance. In various embodiments, the location of the feed point 108 may be selected such that the capacitance and inductance of the portions 110 and 112 of the slot antenna 104 may essentially or substantially cancel each other out and the resonant frequency of the slot antenna 104 may be determined by the width of the slot opening or aperture 106 and the length of the slot antenna 104.

In various embodiments, the width of the slot opening 106 may be very small. In one embodiment, the width of the slot opening 106 may be less than (or equal to) $\frac{1}{200}^{th}$ of the wavelength of the resonant frequency or resonant wavelength. In such an embodiment, a slot antenna 104 with a resonant frequency of approximately 1 GHz may have a slot opening 106 width of less than approximately 1.5 mm. A 2.5 Ghz resonance may have a slot opening of 106 0.6 mm, and so on. In another embodiment, the width of the slot opening 106 may be less than (or equal to) 2 mm. It is understood that the above are merely a few illustrative examples to which the disclosed subject matter is not limited.

In the illustrated embodiment, the slot antenna 104 is illustrated as having a general "L"-like shape. It is understood that the above is merely one illustrative example to which the disclosed subject matter is not limited, and that other figures (e.g., FIGS. 5 and 7) illustrate other slot antenna 104 cavity shapes, to which again the disclosed subject matter is not limited.

Figure 5:
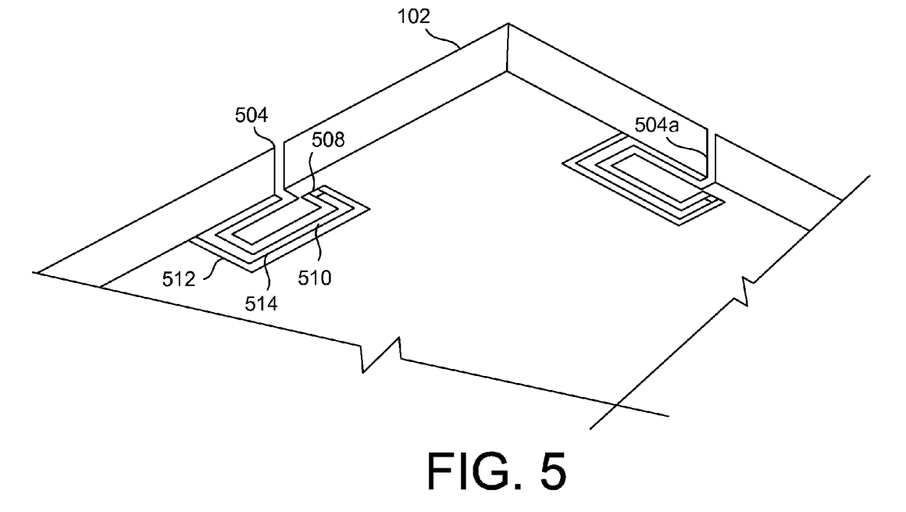
FIG. 5 is a diagram of an example embodiment of a system in accordance with the disclosed subject matter.

Likewise, FIG. 1 only shows a single antenna 104. It is understood that the above is merely one illustrative example to which the disclosed subject matter is not limited. In various embodiments, multiple antennas 104 may exist within or use the same (or different) conductive frames 102. For example, FIG. 5 shows multiple antennas. For example, a system or device may include one or more antennas for each networking or communication standard or frequency. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. In various embodiments, the communications standard or protocol may make use of a multiple-input and multiple-output (MIMO) system that employs multiple antennas (e.g., IEEE 802.11n, cellular 4G, etc.). It is understood that the above are merely a few illustrative examples to which the disclosed subject matter is not limited.

Figure 2:
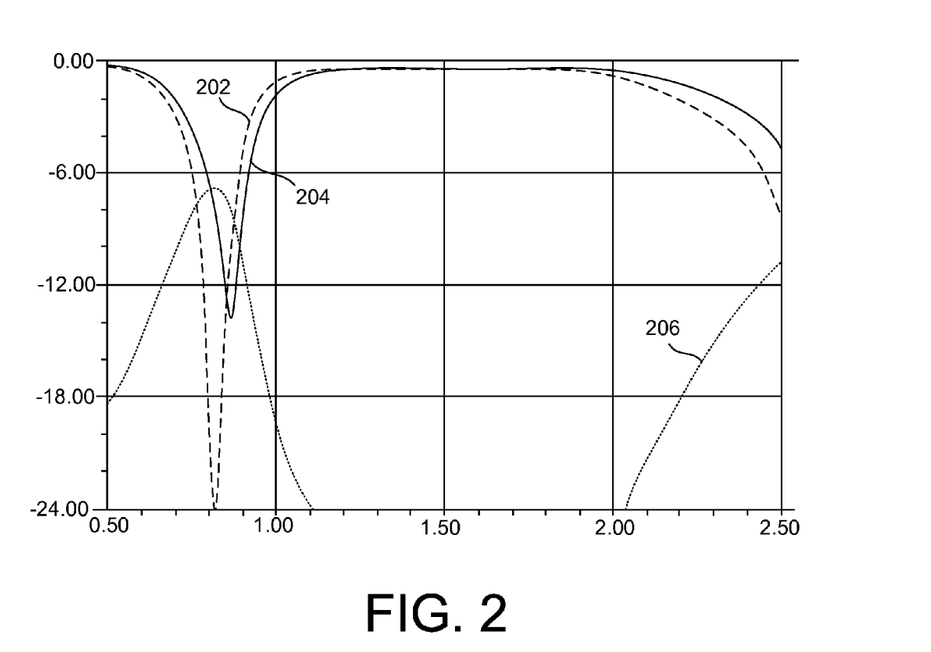
FIG. 2 is a frequency graph produced by an example embodiment of a system in accordance with the disclosed subject matter.

FIG. 2 is a frequency graph 200 produced by an example embodiment of a system (e.g., system 100 of FIG. 1) in accordance with the disclosed subject matter. The Y-axis of graph 200 is measured in decibels (dBs) and the X-axis is measured in frequency, specifically gigahertz (GHz).

Graph 200 may include a line 202 that shows frequency resonance of a first slot antenna (e.g., slot antenna 104 of FIG. 1). Graph 200 may include a line 204 that shows frequency resonance of a second slot antenna (e.g., a second antenna, like slot antenna 104 of FIG. 1). Graph 200 may include a line 204 that shows the mutual coupling between the first slot antenna and the second slot antenna.

In one embodiment (e.g., cellular communications), a frequency may be considered to be matching if the antenna provides a return loss of less than or equal to −6 dB. In the illustrated embodiment, the first and seconds slot antennas provide a resonance at approximately 750-850 megahertz (MHz). It is understood that the above is merely one illustrative example to which the disclosed subject matter is not limited.

Figure 3:
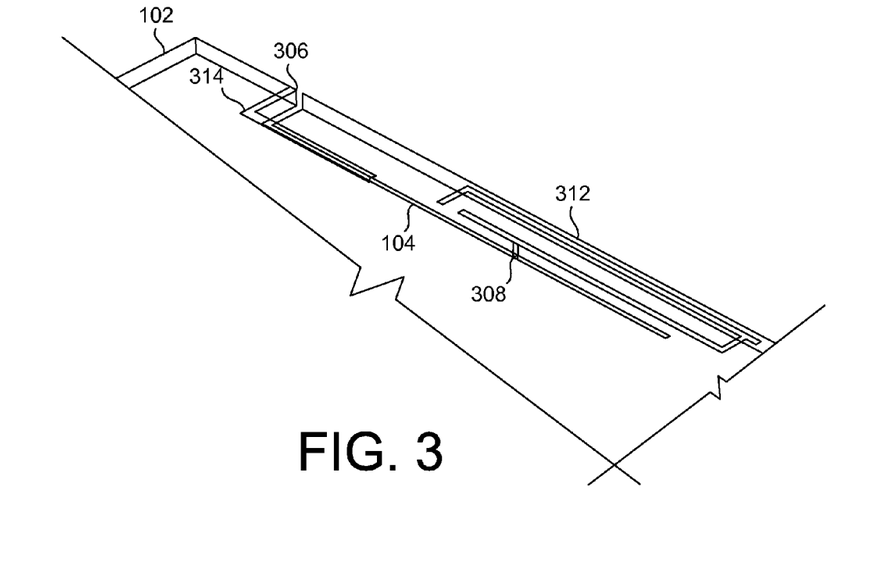
FIG. 3 is a diagram of an example embodiment of a system in accordance with the disclosed subject matter.

FIG. 3 is a diagram of an example embodiment of a system 300 in accordance with the disclosed subject matter. In a preferred embodiment, the system 300 may include a computing device, such as, for example, a shared computing terminal, a thin client, a desktop personal computer, a laptop, a netbook, a tablet, a smartphone, etc.

In one embodiment, the system 300 may include an electrically conductive (e.g., metal, etc.) frame or housing 102. The system 300 may also include a slot antenna 104, as described above.

In various embodiments, the system 300 may also include a coupling element 312, which is illustrated as an un-closed loop. In various embodiments, the coupling element 312 may include a monopole. In some embodiments, the coupling element 312 may include an electrically conductive material (e.g., metal, etc.). In a preferred embodiment, the coupling element 312 and the conductive housing 102 may include the same metal or conductive material. In such an embodiment, the coupling element 312 may be separated from the conductive frame 102 by an insulating material or carrier (e.g., such as that illustrated in FIG. 7).

In various embodiments, the coupling element 312 may be excited by an electrical signal via the feed point 308. In such an embodiment, the coupling element 312 may be capacitively coupled with the slot antenna 104. This capacitive coupling may cause the slot antenna 104 to be excited. This excitation may result in a resonant frequency in the slot antenna 104.

Figure 4:
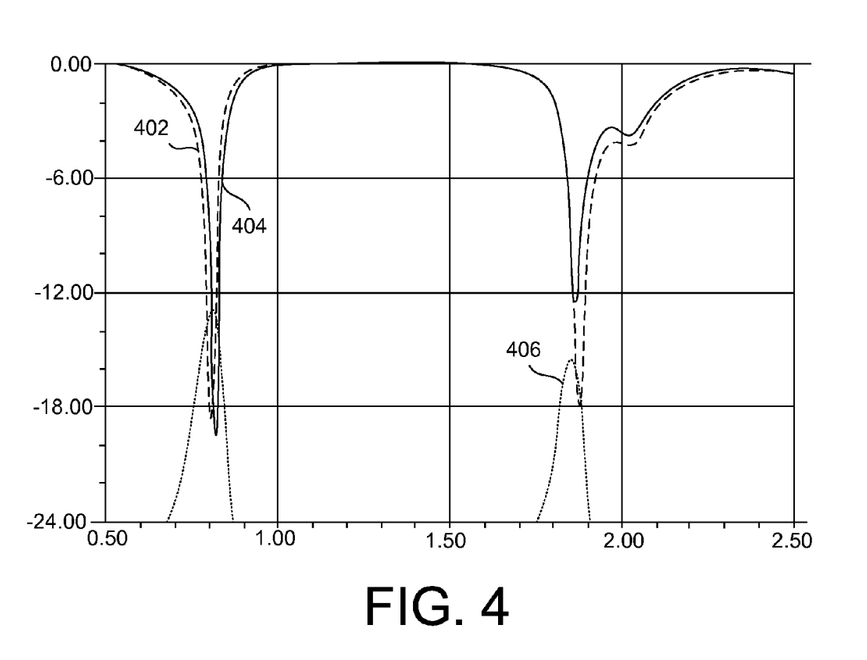
FIG. 4 is a frequency graph produced by an example embodiment of a system in accordance with the disclosed subject matter.

In some embodiments, by adjusting the length of the monopole coupling element 312 and the length of the slot antenna 104, frequency resonances may be created in a lower frequency range (illustrated in FIG. 4). In various embodiments, the desired resonance frequencies may be adjusted by altering the amount of capacitive coupling between the coupling element 312 and the slot antenna 104.

In some embodiments, the system 300 may include a high-frequency coupling arm 314. In such an embodiment, a second parasitic resonance may be created in the high band when a quarter wavelength coupling arm 314 is placed near the High Electric (High-E) field area of the slot antenna 104. In one embodiment, the high-frequency coupling arm 314 may be excited at certain frequencies to create a resonance at or within a high frequency band (wherein high and low frequency are relative to one another). In such an embodiment, the high-frequency coupling arm 314 may be physically coupled or connected with the end 306 of the slot antenna 104.

In the illustrated embodiment, the high-frequency coupling arm 314 is shown as an "L"-shaped comprising an electrically conductive material (e.g., metal, etc.). In a preferred embodiment, the high-frequency coupling arm 314 and the conductive housing 102 may include the same metal or conductive material. In such an embodiment, the high-frequency coupling arm 314 may be separated from the conductive frame 102 by an insulating material or carrier, as described above.

In a preferred embodiment, the slot antenna 104, the coupling element 312, and the high-frequency coupling arm 314 may exist or be placed within two or three different planes or depths of the conductive frame 102, such that, the slot antenna 104, the coupling element 312, and the high-frequency coupling arm 314 are above or below each other. Although, in various embodiments, these elements 104, 312, and 314 may be three-dimensional and connect with one another across their respective primary planes (e.g., at the end 306 of the slot antenna 104, etc.).

FIG. 4 is a frequency graph 400 produced by an example embodiment of a system (e.g., system 300 of FIG. 3) in accordance with the disclosed subject matter. The Y-axis of graph 400 is measured in decibels (dBs) and the X-axis is measured in frequency, specifically gigahertz (GHz).

Graph 400 may include a line 402 that shows frequency resonance of a first slot antenna (e.g., slot antenna 104 of FIG. 3). Graph 400 may include a line 404 that shows frequency resonance of a second slot antenna (e.g., a second antenna, like slot antenna 104 of FIG. 3). Graph 400 may include a line 404 that shows the mutual coupling between the first slot antenna and the second slot antenna.

In the illustrated embodiment, the low-frequency resonance of line 402 (e.g., approximately between 0.76-0.83 GHz) may illustrates a low-frequency resonance of a slot antenna caused by the capacitive coupling between the slot antenna and a coupling element. Likewise, the low-frequency resonance of line 404 (e.g., approximately between 0.79-0.85 GHz) may represent the low-frequency resonance of a second slot antenna due to a second coupling element.

In the illustrated embodiment, the high-frequency resonance of line 402 (e.g., approximately between 1.83-1.90 GHz) may illustrates a high-frequency resonance of a slot antenna caused by a high-frequency coupling arm. Likewise, the high-frequency resonance of line 404 (e.g., approximately between 1.84-1.93 GHz) may represent the high-frequency resonance of a second slot antenna due to a second high-frequency coupling arm. It is understood that the above are merely a few illustrative examples to which the disclosed subject matter is not limited.

FIG. 5 is a diagram of an example embodiment of a system 500 in accordance with the disclosed subject matter. In a preferred embodiment, the system 500 may include a computing device, such as, for example, a shared computing terminal, a thin client, a desktop personal computer, a laptop, a netbook, a tablet, a smartphone, etc.

In various embodiments, the system 500 may include two slot antennas 504 and 504a within the conductive frame or housing 102. Unlike the "L"-shaped slot antennas of FIGS. 1 and 3, the slot antennas 504 and 504a may have a more complex shape, such as the illustrated spiral-like or "paperclip"-like shapes. It is understood that the above is merely one illustrative example to which the disclosed subject matter is not limited.

In such an embodiment, the slot antenna 504 may include a feed point 508. This feed point 508 may divide the slot antenna 504 into a short-circuited portion or transmission line 512 and an open-circuited portion or transmission line 510, as described above. In the illustrated embodiment, the open-circuited portion 510 may be shaped like an un-closed loop, and the short-circuited portion 512 may be "C"-shaped around the open-circuited portion 510. The portions 510 and 512 may be separated by an intervening portion 514 of the conductive frame 102. Likewise, a similar or even identical structure may exist for slot antenna 504a. Again, it is understood that the above is merely one illustrative example to which the disclosed subject matter is not limited.

In various embodiments, two frequency resonances, low and high, may be created in the slot antenna 504. These resonances may be controlled by the length of the respective portions 510 and 512, as described above.

In the illustrated embodiment, an electrical coupling may exist between the portions 510 and 512 due to the way the short-circuited portion 512 is wrapped around the open-circuited portion 510. In another embodiment, the converse may be true. In such an embodiment, the width or amount of the frame portion 514 between the short-circuited portion 512 and the open-circuited portion 510 may control or create additional frequency resonances in the slot antenna 504. In various embodiments, these additional frequency resonances may increase the bandwidth or frequency range at which the slot antenna 504 may radiate or transmit.

In a specific embodiment, the width or X-axis size of the slot antenna 504 may be substantially 16 mm. The height or Y-axis size of the slot antenna 504 may be substantially 8 mm. In various embodiments, the distance between the slot antennas 504 and 504a may be substantially 22 mm. It is understood that the directional terms (e.g., width, height, X-axis size, etc.) are relative and not meant to limit the disclosed subject matter to a specific orientation. It is also understood that the above example is merely one illustrative example to which the disclosed subject matter is not limited.

Figure 6:
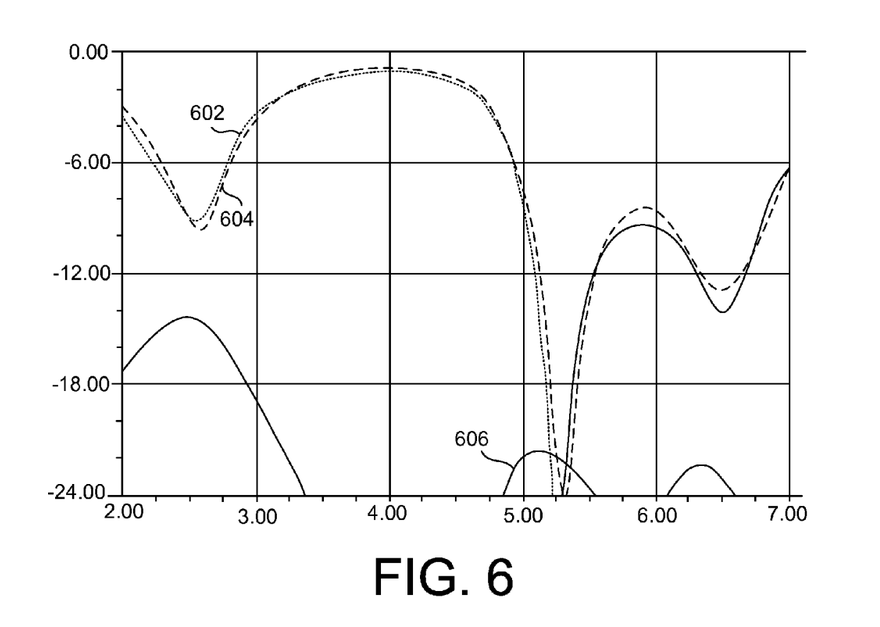
FIG. 6 is a frequency graph produced by an example embodiment of a system in accordance with the disclosed subject matter.

FIG. 6 is a frequency graph 600 produced by an example embodiment of a system (e.g., system 500 of FIG. 5) in accordance with the disclosed subject matter. The Y-axis of graph 600 is measured in decibels (dBs) and the X-axis is measured in frequency, specifically gigahertz (GHz).

Graph 600 may include a line 602 that shows frequency resonance of a first slot antenna (e.g., slot antenna 504 of FIG. 5). Graph 400 may include a line 604 that shows frequency resonance of a second slot antenna (e.g., slot antenna 504a of FIG. 5). Graph 500 may include a line 504 that shows the mutual coupling between the first slot antenna and the second slot antenna.

In the illustrated embodiment, the low-frequency resonance of line 602 (e.g., approximately between 2.15-2.9 GHz) may illustrates a low-frequency resonance of a slot antenna caused by the open-circuited portion of the slot antenna. In the illustrated embodiment, the high-frequency resonance of line 602 (e.g., approximately between 4.97-7.00 GHz) may illustrates a high-frequency resonance of a slot antenna caused by the short-circuited portion of the slot antenna. Likewise, for line 604. It is understood that the above are merely a few illustrative examples to which the disclosed subject matter is not limited.

Figure 7:
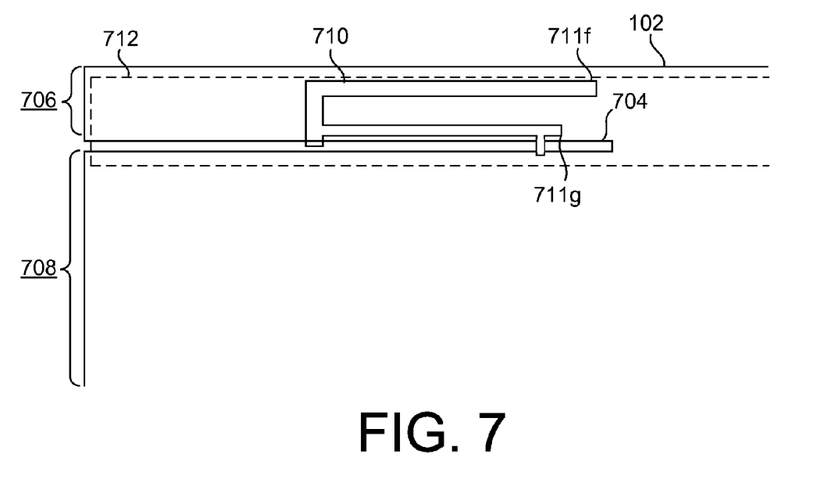
FIG. 7 is a diagram of an example embodiment of a system in accordance with the disclosed subject matter.

FIG. 7 is a diagram of an example embodiment of a system 700 in accordance with the disclosed subject matter. In a preferred embodiment, the system 700 may include a computing device, such as, for example, a shared computing terminal, a thin client, a desktop personal computer, a laptop, a netbook, a tablet, a smartphone, etc.

In various embodiments, the system 700 may include a conductive frame or housing 102 and a slot antenna 704. In the illustrated embodiment, the slot antenna 704 may include a straight or "U"-shaped slot antenna 704, as opposed to the "L"-shaped slot antennas of FIG. 1 or 3, or the more complex structures of FIG. 5. It is understood that the above are merely a few illustrative examples to which the disclosed subject matter is not limited.

In the illustrated embodiment, the slot antenna 704 may be positioned 704 to essentially divide the conductive frame 102 into a ground plane portion 708 and an electrically isolated portion 706 of the conductive frame 102. In such an embodiment, the electrically isolated portion 706 may be separated from the ground plane portion 708 by the slot antenna 704 such that electricity may not flow as freely within the electrically isolated portion 706 as it may in the ground plane portion 708. In various embodiments, the isolated portion 706 may only be as long as the slot antenna 704 that defines it. In one embodiment, the length of the isolated portion 706 may be a quarter wavelength of the desired resonant frequency. In such an embodiment, the slot antenna 704 may be effectively enclosed by the ground plane 708 on a single side.

In various embodiments, an antenna feed point (not shown) may be connected to the isolated portion 706. The isolated portion 706 may be excited, via the feed point, such that a resonance frequency may be created within the slot antenna 704.

In various embodiments, the system 700 may include a coupling element 710, as described above. In the illustrated embodiment, the coupling element 710 may be essentially "U"-shaped as opposed to the unclosed-loop shape illustrated in FIG. 3. It is understood that the above are merely a few illustrative examples to which the disclosed subject matter is not limited. In various embodiments, the length of the coupling element 710 may be a quarter wavelength of it respective desired resonant frequency.

In such an embodiment, a second resonant frequency may be created with the slot antenna 704 via the capacitive coupling between the coupling element 710 and the slot antenna 704. An electrical signal may be applied to the coupling element 710, as described above. In various embodiments, the coupling element 710 may be physically separated by a non-conductive separator 712 in order to prevent the direct (versus capacitive) electrical coupling between the coupling element 710 and either the slot antenna 704 or the isolated portion 706. In various embodiments, a grounding wire or connector (not shown) may directly couple a grounding-point 711g of the coupling element 710 to the grounding plane portion 708. In such an embodiment, the length or distance between the grounding point 711g and the feed point 711f of the coupling element 710 may control the matching of the resonance for the coupling element 710.

Figure 8:
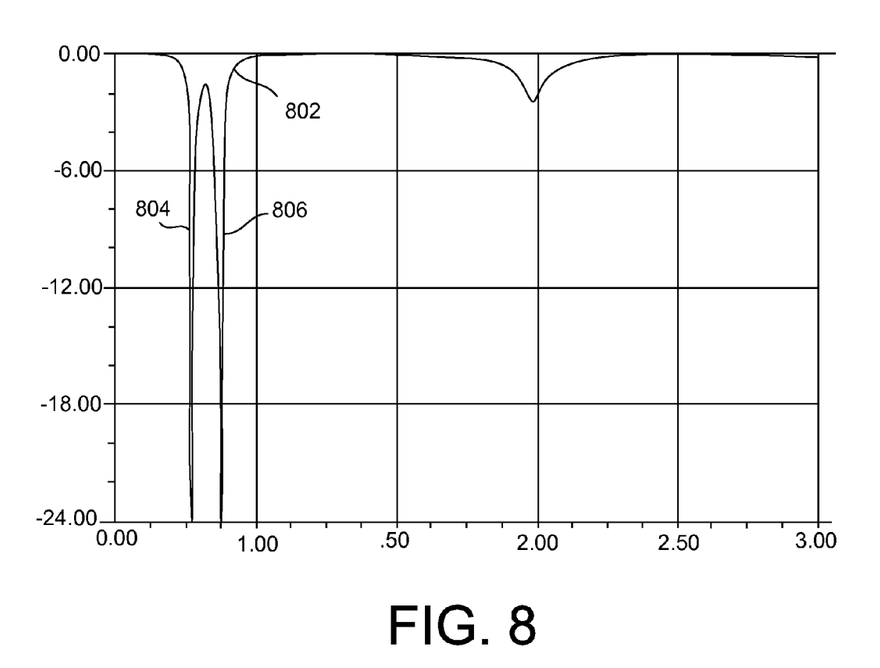
FIG. 8 is a frequency graph produced by an example embodiment of a system in accordance with the disclosed subject matter.

FIG. 8 is a frequency graph 800 produced by an example embodiment of a system (e.g., system 700 of FIG. 7) in accordance with the disclosed subject matter. The Y-axis of graph 800 is measured in decibels (dBs) and the X-axis is measured in frequency, specifically gigahertz (GHz).

Graph 800 may include a line 802 that shows frequency resonance of a slot antenna (e.g., slot antenna 704 of FIG. 7). The line 802 may include two resonance portions 804 and 806. In the illustrated embodiment, the resonance portion 804 may illustrate the resonance frequencies caused by the coupling element. The resonance portion 806 may illustrate the resonance created by the isolated portion of the conductive frame. It is understood that the above are merely a few illustrative examples to which the disclosed subject matter is not limited.

Figure 9:
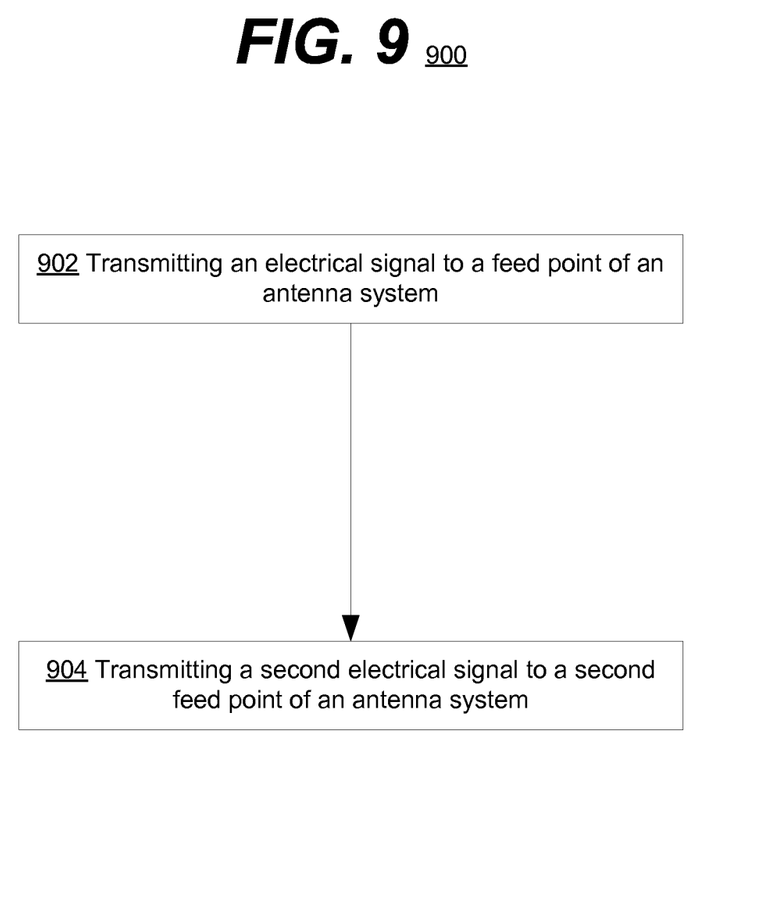
FIG. 9 is a flowchart of an example embodiment of a technique in accordance with the disclosed subject matter.

FIG. 9 is a flow chart of an example embodiment of a technique in accordance with the disclosed subject matter. In various embodiments, the technique 900 may be used or produced by the systems such as those of FIG. 1, 3, 5, 7, or 10. Furthermore, portions of technique 900 may be used to produce results such as illustrated by FIG. 2, 4, 6, or 8. Although, it is understood that the above are merely a few illustrative examples to which the disclosed subject matter is not limited. It is understood that the disclosed subject matter is not limited to the ordering of or number of actions illustrated by technique 900.

Block 902 illustrates that, in one embodiment, an electrical signal may be transmitted to a feed point of an antenna system, as described above. In various embodiments, the antenna system may include a slot antenna with a slot opening, as described above. In some embodiments, this slot antenna may be included by or an electrically conductive frame, as described above. In some embodiments, this slot antenna may be configured to provide a first frequency resonance and to transmit the applied electrical signal, as described above. In some embodiments, the slot opening may be very small, such as, for example less than $\frac{1}{200}^{th}$ of the slot antenna's resonant wavelength, as described above. In various embodiments, the electrically conductive frame may, at least in part, form a ground plane for the slot antenna. It is understood that the above is merely one illustrative example to which the disclosed subject matter is not limited.

In some embodiments, the feed point may split or divide the slot antenna into a short-circuited portion and an open circuited portion. In one such embodiment, the feed point may be positioned such that a capacitance of the short-circuited portion and the inductance of the open-circuited portion may combine to match a predetermined impedance (e.g., 75Ω, etc.). In various embodiments, the short-circuited portion of the slot antenna may be positioned substantially around the open-circuited portion of the slot antenna in order to create, via a capacitive coupling, a second resonant frequency with the slot antenna, as described above.

In another embodiment, the antenna system may include an electrically conductive coupling element, as described above. In one such embodiment, the feed point may be included by or coupled with the electrically conductive coupling element, as described above. In various embodiments, the electrically conductive coupling element may be positioned so as not to physically touch the slot antenna. In various embodiments, the electrically conductive coupling element may be capacitively coupled with the slot antenna to provide the resonant frequency or least another resonant frequency, as described above.

In yet another embodiment, the slot antenna may be positioned within the electrically conductive frame to create an isolated portion of the electrically conductive frame, as described above. In such an embodiment, the feed point may be included by or coupled with the isolated portion, as described above. In such an embodiment, when the isolated portion is excited it may create the resonant frequency within the slot antenna.

In various embodiments, one or more of the action(s) illustrated by this Block may be performed by the apparatuses or systems of FIG. 1, 3, 5, 7, or 10, the feed point, slot antenna, and electrically conductive frames of FIG. 1, 3, 5, or 7, as described above.

Block 904 illustrates that, in one embodiment, a second feed point of the antenna system may be excited or have a second electrical signal transmitted to it, as described above. In various embodiments, in addition to the slot antenna and the electrically conductive frame, the antenna system may include an electrically conductive coupling element, as described above. In such an embodiment, the electrically conductive coupling element may be configured to be excited via the second feed point and create, via a capacitive coupling, a second frequency resonance with the slot antenna, as described above. In various embodiments, one or more of the action(s) illustrated by this Block may be performed by the apparatuses or systems of FIG. 5, 7, or 10, the feed points, slot antennas, electrically conductive frames, and electrically conductive coupling elements of FIG. 5 or 7, as described above.

In various embodiments, once the electrical signal or signals have been applied to the feed point(s), the antenna system may then transmit or broadcast that electrical signal or substantially the information included therein via a radio wave in such a way that the electrical single may be received by another device (e.g., via that device's antenna system). In another embodiment, the antenna system may first receive the electrical signal via a radio wave (e.g., from another device, etc.) and then transmit that electrical signal or substantially the information included therein, to the feed point where from there it may be received and processed by the device that includes the antenna system. It is understood that the above are merely a few illustrative examples to which the disclosed subject matter is not limited.

Figure 10:
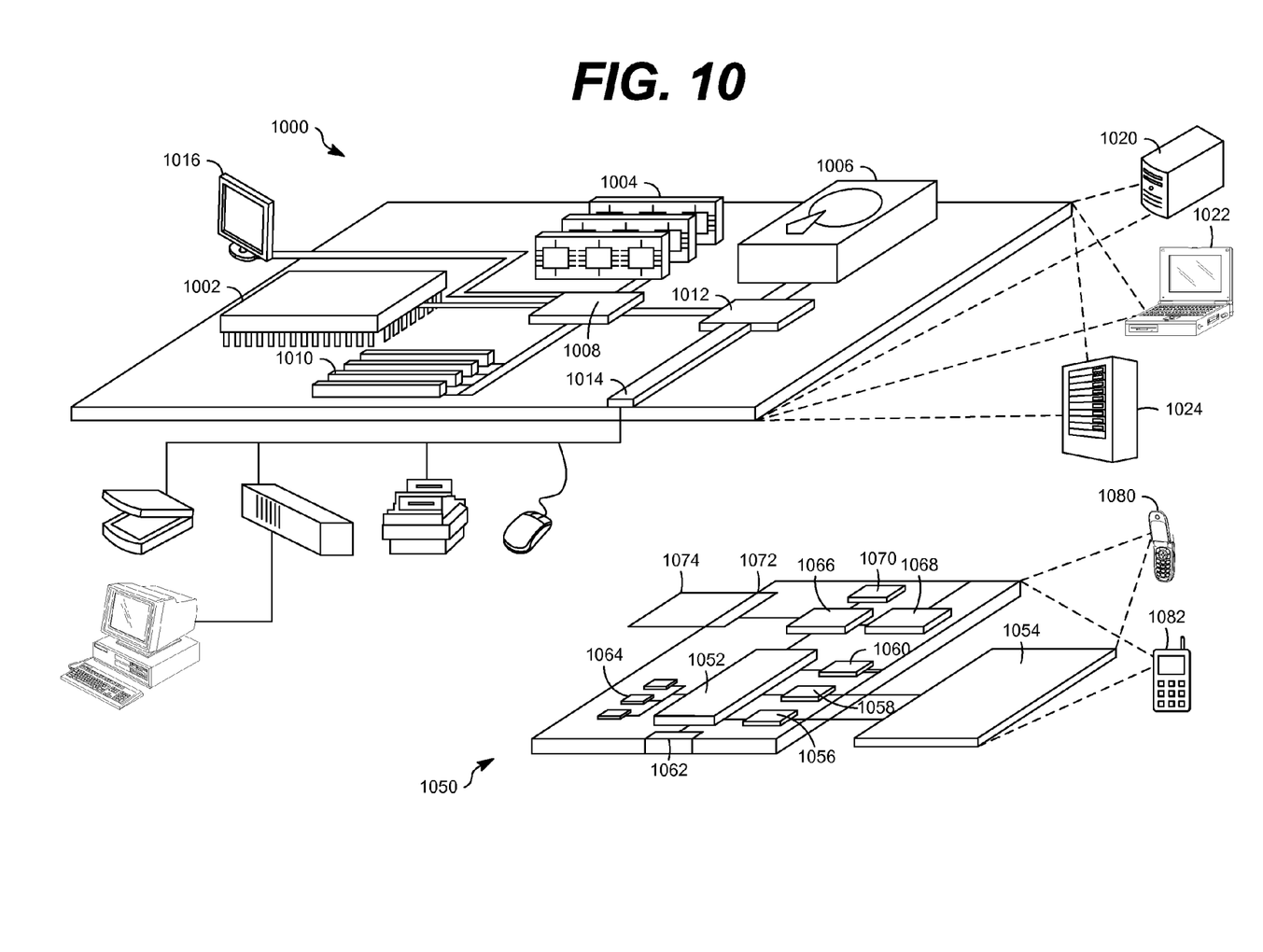
FIG. 10 shows an example of a computer device and a mobile computer device that can be used in accordance with the disclosed subject matter.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus comprising:
an electrically conductive frame; and
an L-shaped slot antenna formed, at least in part, by the electrically conductive frame and within a first plane of the conductive frame, wherein the L-shaped slot antenna includes a slot opening and is configured to provide at least a first frequency resonance and includes a feed point dividing the L-shaped slot antenna into an open-circuited portion and a short-circuited portion;
a coupling element formed within a second plane of the conductive frame and separated from the conductive frame by a first insulating material, the coupling element being configured to be excited by an electrical signal via the feed point, the feed point being disposed proximate to the coupling element and the L-shaped slot antenna such that a first portion of the coupling element is proximate to the open-circuited portion and a second portion of the coupling element is proximate to the short-circuited portion;
a coupling arm coupled with an end of the L-shaped slot antenna, the coupling arm being formed within a third plane of the conductive frame and separated from the conductive frame by a second insulating material,
wherein the first plane, second plane, and third plane are different planes such that the L-shaped slot antenna, the coupling element, and the coupling arm are above or below each other.

2. The apparatus of claim 1, wherein the feed point of the slot antenna is configured to directly receive an electrical signal.

3. The apparatus of claim 1, wherein the coupling arm is configured to be excited by the electrical signal to create a second frequency resonance with the L-shaped slot antenna, the second frequency resonance being higher than the first frequency resonance.

4. The apparatus of claim 1, wherein the feed point is positioned such that a capacitance of the short-circuited portion of the L-shaped slot antenna and an inductance of the open-circuited portion of the L-shaped slot antenna match a predetermined impedance.

5. The apparatus of claim 1, wherein the electrically conductive frame forms a ground plane for the L-shaped slot antenna.

6. The apparatus of claim 1, wherein:
the coupling element is configured to create, via capacitive coupling, the first frequency resonance with the L-shaped slot antenna.

7. The apparatus of claim 1, wherein:
the L-shaped slot antenna is positioned within the electrically conductive frame to create an isolated portion of the electrically conductive frame, and
the isolated portion of the electrically conductive frame is configured to be electrically excited to create the first frequency resonance.

8. The apparatus of claim 7, wherein the coupling element and the isolated portion of the electrically conductive frame are physically separated in order to prevent direct electric coupling.

9. The apparatus of claim 1, wherein a portion of the coupling arm within the third plane overlaps with a portion of the L-shaped slot antenna within the first plane.

10. The apparatus of claim 1, wherein the feed point is disposed between the coupling element and the L-shaped slot antenna such that the coupling element and the L-shaped slot antenna are configured to be excited by the electrical signal via the feed point creating the first frequency resonance.

11. The apparatus of claim 1, wherein a width of the slot opening is equal to or less than $1/200^{th}$ of a wavelength of the first frequency resonance.

12. The apparatus of claim 1, wherein the coupling arm is physically connected to the end of the L-shaped slot antenna, and the end of the L-shaped slot antenna is an end portion of a conductive housing that defines the slot opening.

13. A method comprising:
transmitting an electrical signal to a feed point of an antenna system;

wherein the antenna system includes an L-shaped slot antenna, a coupling element, and a coupling arm;
wherein the L-shaped slot antenna:
  is included within a first plane of an electrically conductive frame,
  includes a slot opening,
  is configured to provide at least a first frequency resonance; and
  includes a feed point dividing the slot antenna into an open-circuited portion and a short-circuited portion;
wherein the coupling element is formed within a second plane of the conductive frame and is separated from the conductive frame by a first insulating material, the coupling element being configured to be excited by an electrical signal via the feed point, the feed point being disposed proximate to the coupling element and the L-shaped slot antenna such that a first portion of the coupling element is proximate to the open-circuited portion and a second portion of the coupling element is proximate to the short-circuited portion;
wherein the coupling arm is coupled with an end of the L-shaped slot antenna and is formed within a third plane of the conductive frame and is separated from the conductive frame by a second insulating material; and
wherein the first plane, second plane, and third plane are different planes such that the L-shaped slot antenna, coupling element, and the coupling arm are above or below each other.

14. The method of claim 13, wherein the feed point is positioned such that a capacitance of the short-circuited portion of the L-shaped slot antenna and an inductance of the open-circuited portion of the L-shaped slot antenna match a predetermined impedance.

15. The method of claim 13, wherein the electrically conductive frame forms a ground plane for the L-shaped slot antenna.

16. The method of claim 13, wherein the coupling arm is configured to be excited by the electrical signal to create a second frequency resonance with the L-shaped slot antenna, the second frequency resonance being higher than the first frequency resonance.

17. The method of claim 13, wherein:
the L-shaped slot antenna is positioned within the electrically conductive frame to create an isolated portion of the electrically conductive frame, and
the isolated portion of the electrically conductive frame is configured to be electrically excited, via the feed point, to create the first frequency resonance.

18. An apparatus comprising:
a processor to execute instructions;
a monitor to display information to a user;
an electrically conductive housing to at least partially house the processor, the monitor, and an antenna system; and
the antenna system that includes an L-shaped slot antenna, a coupling element, and a coupling arm;
wherein the L-shaped slot antenna:
  is included within a first plane of the electrically conductive housing,
  includes a slot opening,
  is configured to provide at least a first frequency resonance; and
  includes a feed point dividing the slot antenna into an open-circuited portion and a short-circuited portion;
wherein the coupling element is:
  formed within a second plane of the electrically conductive housing;
  separated from the electrically conductive housing by a first insulating material; and
  configured to be excited by an electrical signal via the feed point;
wherein the coupling arm is:
  coupled with an end of the L-shaped slot antenna, the feed point being disposed proximate to the coupling element and the L-shaped slot antenna such that a first portion of the coupling element is proximate to the open-circuited portion and a second portion of the coupling element is proximate to the short-circuited portion;
  formed within a third plane of the electrically conductive housing; and
  separated from the electrically conductive housing by a second insulating material; and
wherein the first plane, second plane, and third plane are different planes such that the L-shaped slot antenna, the coupling element, and the coupling arm are above or below each other.

19. The apparatus of claim 18, wherein the coupling arm is configured to be excited by the electrical signal to create a second frequency resonance with the L-shaped slot antenna, the second frequency resonance being higher than the first frequency resonance.

20. The apparatus of claim 1, wherein:
the coupling arm is L-shaped; and
the coupling element is capacitively coupled with the L-shaped slot antenna.

* * * * *